(12) United States Patent
Hasegawa et al.

(10) Patent No.: US 11,487,457 B2
(45) Date of Patent: Nov. 1, 2022

(54) RECLASSIFICATION OF FILES IN A HIERARCHICAL STORAGE MANAGEMENT SYSTEM

(71) Applicant: International Business Machines Corporation, Armonk, NY (US)

(72) Inventors: Tohru Hasegawa, Tokyo (JP); Hiroshi Itagaki, Yokohama (JP); Tsuyoshi Miyamura, Yokohama (JP); Shinsuke Mitsuma, Machida (JP); Atsushi Abe, Ebina (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/199,488

(22) Filed: Mar. 12, 2021

(65) Prior Publication Data
US 2022/0291855 A1    Sep. 15, 2022

(51) Int. Cl.
*G06F 3/06* (2006.01)
*G06F 16/16* (2019.01)
*G06F 16/185* (2019.01)

(52) U.S. Cl.
CPC .......... *G06F 3/0647* (2013.01); *G06F 3/0604* (2013.01); *G06F 3/0685* (2013.01); *G06F 16/164* (2019.01); *G06F 16/185* (2019.01)

(58) Field of Classification Search
CPC .... G06F 3/0647; G06F 3/0604; G06F 3/0685; G06F 16/164; G06F 16/185
See application file for complete search history.

(56) References Cited

U.S. PATENT DOCUMENTS

| | | |
|---|---|---|
| 2018/0018089 A1 | 1/2018 | Araki |
| 2019/0087108 A1 | 3/2019 | Bhagi |
| 2019/0250998 A1 | 8/2019 | Bedadala |
| 2019/0361622 A1* | 11/2019 | Hasegawa ............... G06F 16/18 |
| 2020/0073575 A1* | 3/2020 | Cai ....................... G06F 16/1734 |
| 2020/0364179 A1 | 11/2020 | Khinvasara |

OTHER PUBLICATIONS

Hasegawa et al., "Content Driven Storage and Retrieval of Files", U.S. Appl. No. 17/063,751, filed Oct. 6, 2020, 31 Pages.

* cited by examiner

*Primary Examiner* — Edward J Dudek, Jr.
(74) *Attorney, Agent, or Firm* — Donald G. Weiss; Gavin Giraud (57) ABSTRACT

In an approach to automatically reclassifying files in an HSM system, responsive to occurrence of a recall to move a file on a hierarchical storage system from a secondary storage to a primary storage, whether stub metadata exists for the file is determined. Responsive to determining that stub metadata exists for the file, whether reclassification of the file is necessary is determined based on the stub metadata. Responsive to determining that the reclassification of the file is necessary, the file is reclassified, where the reclassification uses a latest classification model, and further where the stub metadata is updated with results of the reclassification. The file is migrated from the primary storage to the secondary storage based on the stub metadata.

20 Claims, 5 Drawing Sheets

RECLASSIFICATION OF FILES IN A HIERARCHICAL STORAGE MANAGEMENT SYSTEM

BACKGROUND

The present invention relates generally to the field of data storage, and more particularly to automatically reclassifying files in a Hierarchical Storage Management (HSM) system.

Magnetic tape data storage is a system for storing digital information on magnetic tape using digital recording. The tapes are usually stored on cartridges or cassettes, but for drives that are used as data storage tape backups, the tape is often wound on reels. The Linear Tape Open single reel cartridge was announced in 1997 at a capacity of 100 megabytes, and now in its eighth generation, it supports 12 terabytes in the same sized cartridge. The reason magnetic tape drives are still in use today, especially as an offline data backup, is because of long archival stability and very favorable unit costs.

HSM is a data storage technique that automatically moves data between high-cost and low-cost storage media. HSM systems exist because high-speed storage devices, such as solid-state drive arrays and hard disk drives, are more expensive (per byte stored) than slower devices, such as optical discs and magnetic tape drives. While it would be ideal to have all data available on high-speed devices all the time, this is prohibitively expensive for many organizations. Instead, HSM systems store the bulk of the enterprise's data on slower devices, and then copy data to faster devices when needed. In effect, HSM turns the fast disk drives into caches for the slower mass storage devices. The HSM system monitors the way data is used and makes best guesses as to which data can safely be moved to slower devices and which data should stay on the fast devices.

SUMMARY

Embodiments of the present invention disclose a method, a computer program product, and a system for automatically reclassifying files in an HSM system. In one embodiment, responsive to occurrence of a recall to move a file on a hierarchical storage system from a secondary storage to a primary storage, whether stub metadata exists for the file is determined. Responsive to determining that stub metadata exists for the file, whether reclassification of the file is necessary is determined based on the stub metadata. Responsive to determining that the reclassification of the file is necessary, the file is reclassified, where the reclassification uses a latest classification model, and further where the stub metadata is updated with results of the reclassification. The file is migrated from the primary storage to the secondary storage based on the stub metadata.

DETAILED DESCRIPTION

LTFS (Linear Tape File System) is software to enable access to a tape through an interface of the file system.

LTFS is realized by storing data on a tape cartridge conforming to LTFS open format and is implemented by a number of vendors. When LTFS is used in an application in which a Hard Disc Drive (HDD) has been used, it is possible to keep using the application without making any changes. However, when LTFS is used to operate an application assuming use of HDD, depending on a position on a file stored on a tape, it may take more time than expected to access the file, thus leading to timeout of access to the file in the application.

In order to avoid such a situation, instead of directly using a file on LTFS, HSM is typically constructed with a high-speed storage such as HDDs and solid-state drives (SSDs) as a primary storage and LTFS as a secondary storage.

HSM is a data storage technique that automatically moves data between high-cost and low-cost storage media. The concept of HSM technology is similar to a memory cache in a computer, where the most actively used data is stored on expensive static random-access memory and the less frequently accessed data is stored on a much slower dynamic random-access memory.

In a typical HSM scenario, data files which are frequently used are stored in primary storage, such as disk drives, including flash-based SSDs, but are eventually migrated to tape if they are not used for a certain period of time. If a user does access a file which is on tape, it is automatically moved back to primary storage. The advantage is that the total amount of stored data can be much larger than the capacity of the disk storage available, but since only rarely used files are on tape, most users will usually not notice any slowdown. The operation of moving a file stored on the primary storage to a tape is called migration, whereas the operation of moving the file from the tape back to the primary storage is called recall. There is an intermediate state, called pre-migration, when the file has been copied to the secondary storage, but not yet removed from the primary storage. In effect, the file exists on both the primary and secondary storage at the same time. During the migrate operation, the file on the primary storage is replaced with a stub file that contains a small amount of information that can be used to retrieve the original file if necessary. Upon occurrence of an access to the stub, the file is read from the secondary storage and moved to the primary storage, thereby responding to the access.

Files in an HSM system typically can exist in one of three states. In the resident state, the file is located only on the primary storage, not on the secondary storage. In the pre-migrated state, the file placed on the primary storage was copied to the secondary storage, but still exists on the primary storage, as mentioned above. In the migrated state, the file placed on the primary storage has been copied to the secondary storage and then the file on the primary storage was replaced by a stub.

In the general operation of HSM, when a file in the migrated state is recalled, it initially returns into the pre-migrated state. The state is intentionally brought back to the migrated state after a prescribed period, or depending on usage of the primary storage, without bringing the file into the resident state (i.e., the file on the primary storage is processed to be a stub). This assumes that a file accessed once may be accessed again within a short period of time, so the file is not migrated until a predetermined period of time has elapsed without an additional access.

To recall a file, first it is necessary to mount a tape which stores the file when the tape is not mounted on a tape drive. To recall several files, it is necessary to read the files by mounting tapes storing the files. Thus, by using the same tape as much as possible to store files that may be read collectively, readout time can be reduced. For that purpose, existing technologies use a document classification technique used in machine learning to classify target files based on contents of the files in migration and allocates tapes to the files according to the result of the classification. These machine learning systems generate models that are used to classify the data in the file. These models are typically updated to reflect the latest classification predictions. By allocating tapes for migration within a pool in advance according to the classification result, files having the same classification result can be migrated onto the same tape.

In general, these systems review and update models periodically to maintain high accuracy of the result in the machine learning models. Therefore, it is desirable to periodically reclassify migrated archive files by using a new or updated model. However, when files are recalled exclusively for reclassification, the tape drives may not be available upon occurrence of the file recall due to ongoing file access, which may result in a slow response to the file access.

The present invention is a computer implemented method, computer program product, and system to address the problem of reclassification for model updates without preventing recall due to file access.

When files are classified, information used for classification (model information) and a result of the classification are stored as metadata in the stub. Examples of the model information may include an identifier of the model (e.g., model creation date/time, model version, etc.). Examples of the classification result may include an ID representing a classification result (e.g., ID1 referring to the support division, and ID2 referring to the quality management division, as used in the example of FIG. 2 below).

According to the existing art, when files in the migrated state are recalled, the files are read from the secondary storage and copied to the primary storage in the pre-migrated state, and then the stub is deleted from the primary storage.

Figure 3:
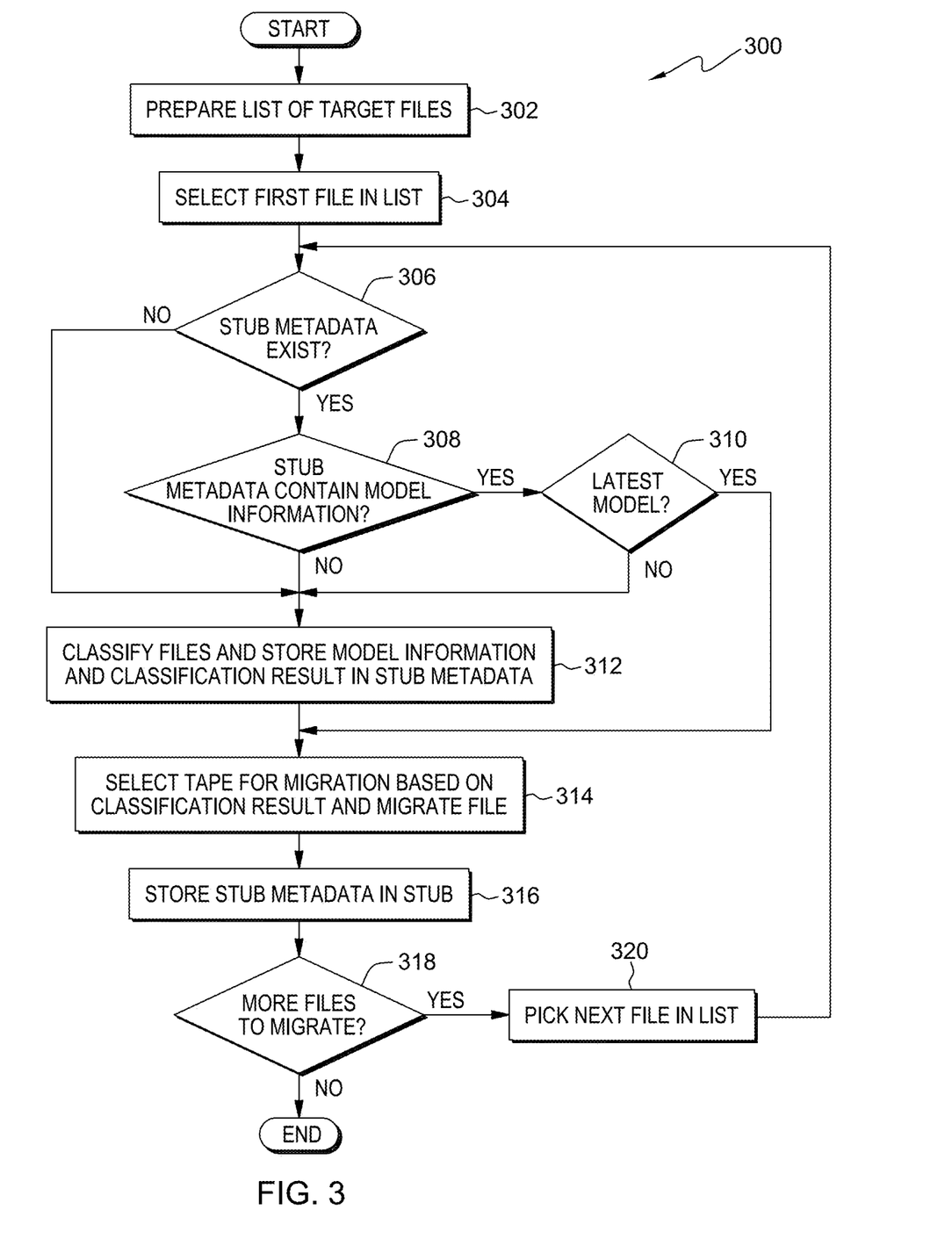
FIG. 3 is a flowchart depicting operational steps of the resident to migrated procedure performed by reclassification program 112 to migrate files from the resident state, on a computing device within the distributed data processing environment of FIG. 1, in accordance with an embodiment of the present invention.

In contrast, according to the present invention, metadata included in the stub is stored and is referred to as stub metadata. The stub metadata is then stored in the stub for use in migrating files again. When the file is to be changed from the pre-migrated state back to the migrated state, it is first determined based on the model information and the classification result whether reclassification is necessary. If the model used for the classification is old and reclassification is necessary, the pre-migrated state is changed to the resident state and classification is made again using the then-current model. The file will then be migrated using the new classification when the system next determines that the file is due to be migrated, e.g., when the time since last access exceeds a predetermined threshold. The procedure for moving files in the resident state to the migrated state is shown in FIG. 3 below.

Figure 4:
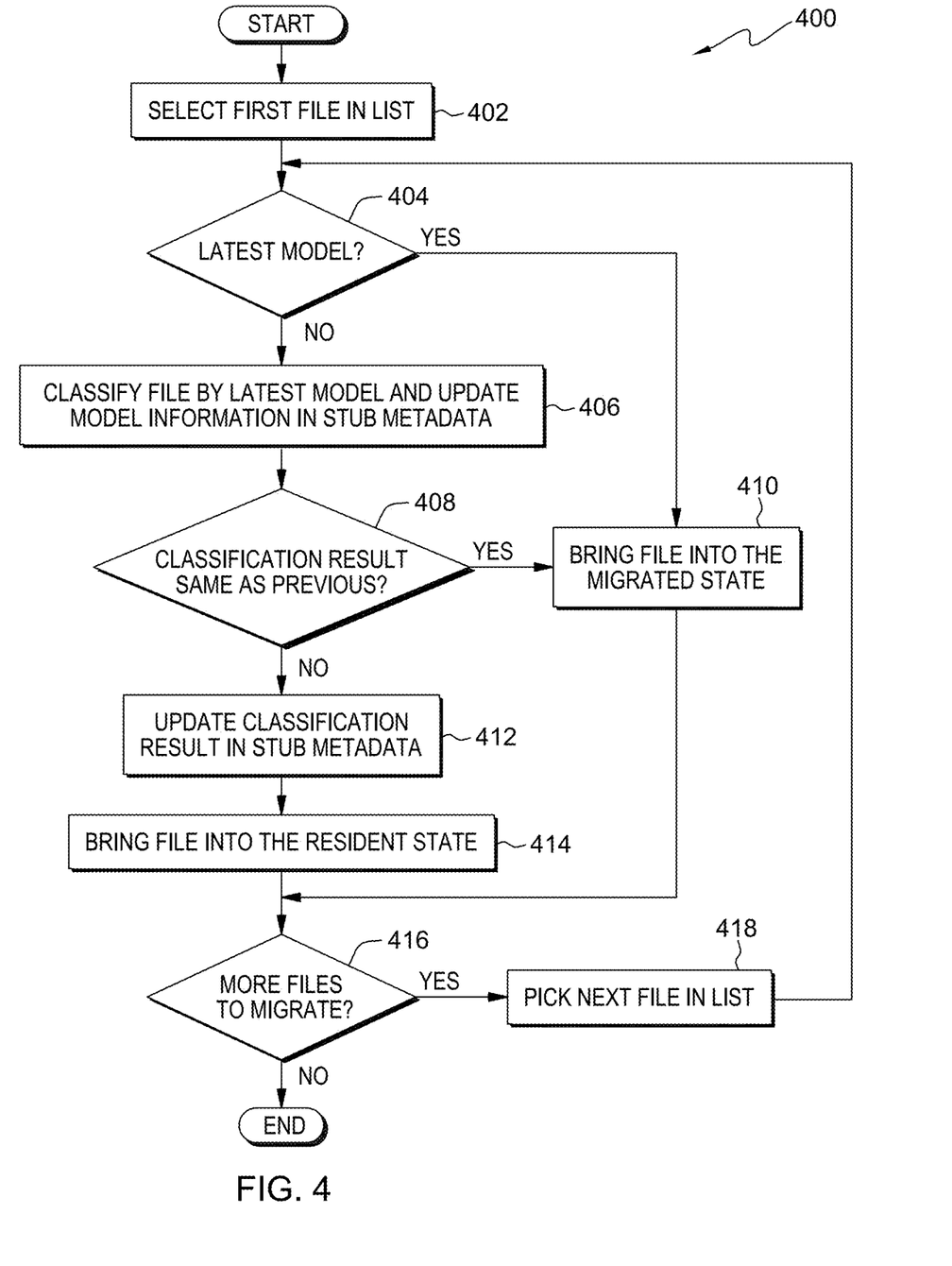
FIG. 4 is a flowchart depicting operational steps of the pre-migrated to migrated check procedure performed by reclassification program 112 whenever a file is a candidate to change from the pre-migrated state to the migrated state, on a computing device within the distributed data processing environment of FIG. 1, in accordance with an embodiment of the present invention.

When recall occurs due to file access, the file is usually brought into the migrated state after a prescribed period of time or based on the usage of the primary storage. However, according to the present invention, at the time of bringing the file from the pre-migrated state into the migrated state, it is brought into the resident state as needed by checking the model information. First, in the same manner as the conventional HSM, a list of files regarded as candidates to change from the pre-migrated state to the migrated state is prepared. This list is prepared based on an operation policy such as a policy of selecting files based on the elapse of a prescribed time since the files were brought into the pre-migrated state or selecting files with large file size according to usage of the primary storage. By doing so, files brought into the resident state are classified again at the same time as other files in the resident state are classified to migrate files. In the present invention, files included in the list are checked to be brought into either the migrated state or the resident state according to a flow as shown in FIG. 4 below.

In the existing art to recall files exclusively for reclassification, the tape drives may not be free upon occurrence of recall due to ongoing file accesses, which may result in a slow response to the file access. In general, recall due to file access is implemented with higher priority than migration subjected to batch processing. This method causes reclassification of files at the time of migration and therefore enables reclassification without preventing recall due to file access.

Use of the present invention does not require that all migrated files are classified again by using a new model, but only causes recalled files to be reclassified. For reclassification of all the files, all the files need to be recalled for reclassification in the same manner as the existing art. However, when the present invention is used, model information is stored in the file stub so that only files based on a model which is not the latest one will be recalled for reclassification, thus making it possible to reduce the number of files recalled for reclassification.

Figure 1:
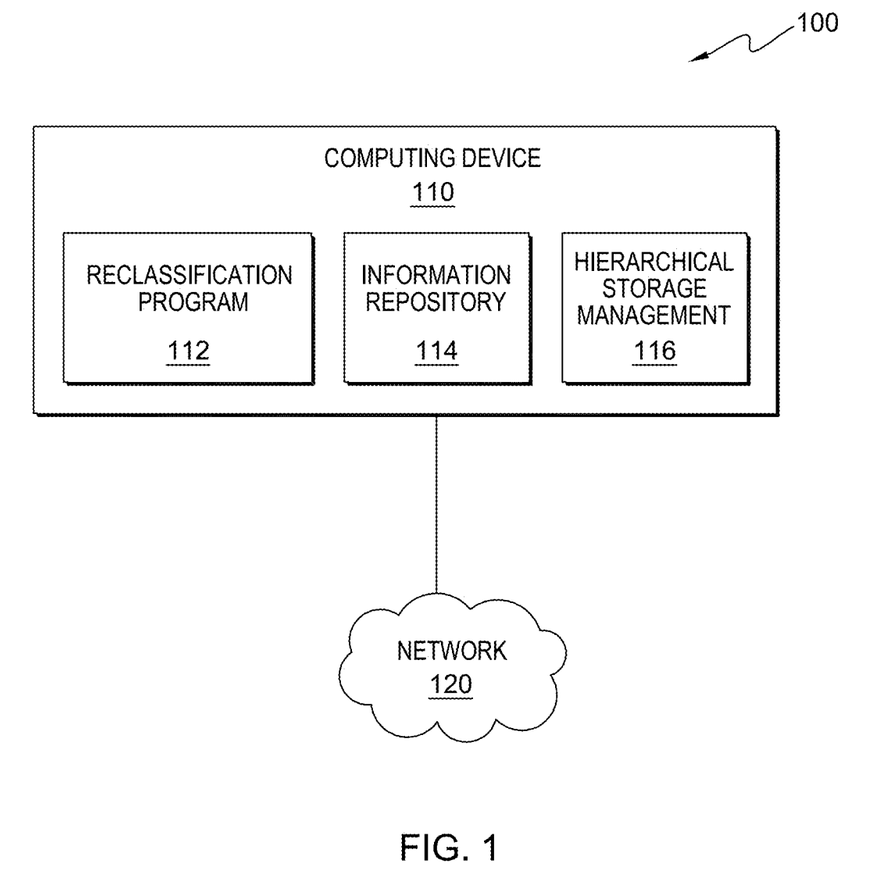
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of reclassification program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, computing device 110 includes reclassification program 112. In an embodiment, reclassification program 112 is a program, application, or subprogram of a larger program for automatically reclassifying files in an HSM system. In an alternative embodiment, reclassification program 112 may be located on any other device accessible by computing device 110 via network 120.

In an embodiment, computing device 110 includes information repository 114. In an embodiment, information repository 114 may be managed by reclassification program 112. In an alternate embodiment, information repository 114 may be managed by the operating system of the device, alone, or together with, reclassification program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, system configuration data, storage system (HSM) configuration data, file classification data, filesystem data, and other data that is received by reclassification program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), SSDs, or random-access memory (RAM). Similarly, the information repository 114 may be implemented with any suitable storage architecture known in the art, such as a relational database, an object-oriented database, or one or more tables.

In an embodiment, computing device 110 includes hierarchical storage management (HSM) system 116. In an embodiment, HSM system 116 may be managed by reclassification program 112. In an alternate embodiment, HSM system 116 may be managed by the operating system of the device, alone, or together with, reclassification program 112. In some embodiments, HSM system 116 is located externally to computing device 110 and accessed through a communication network, such as network 120. In some embodiments, HSM system 116 is stored on computing device 110. In some embodiments, HSM system 116 may reside on another computing device (not shown), provided that HSM system 116 is accessible by computing device 110.

Figure 2:
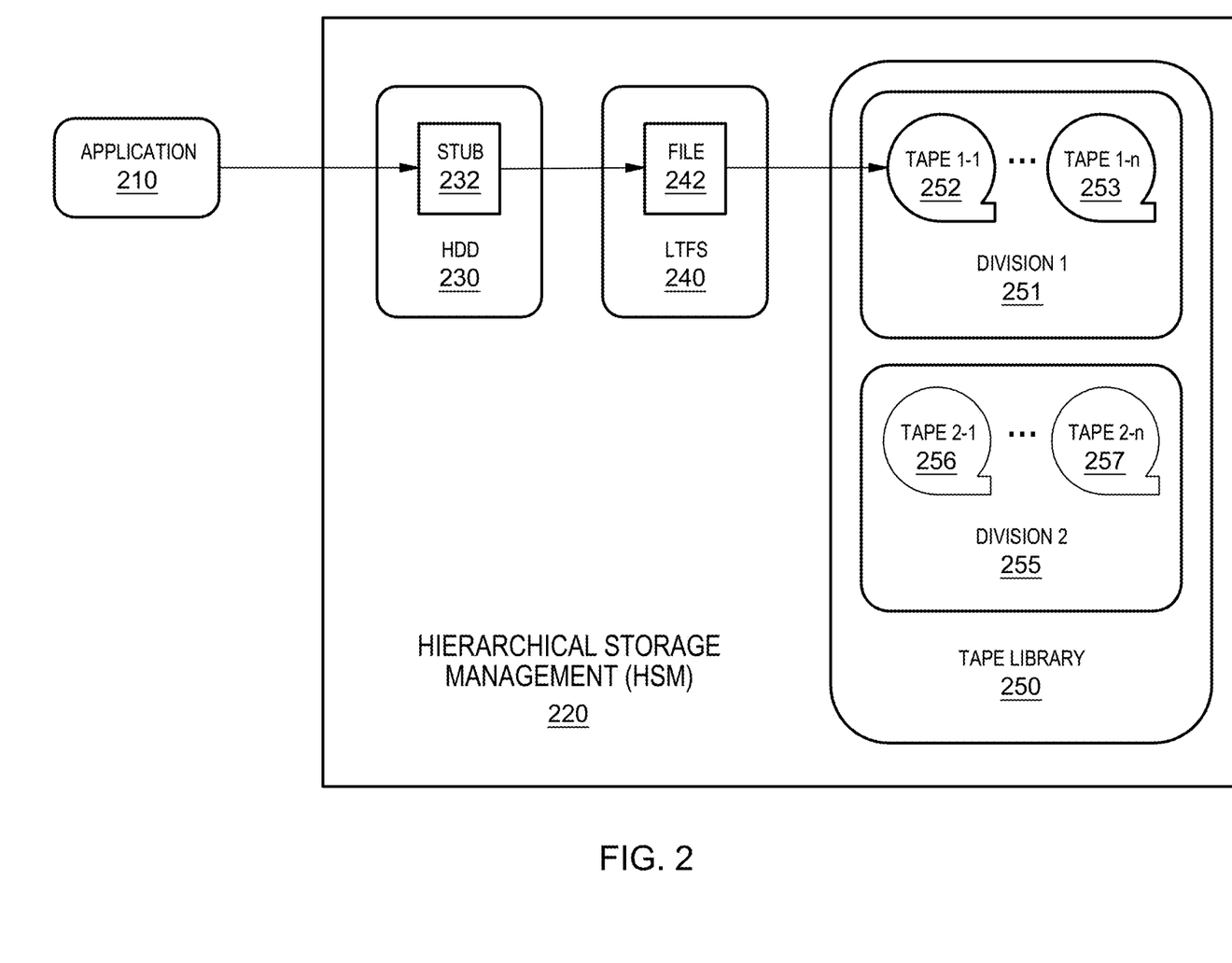
FIG. 2 is an example of an HSM system, which includes one or more tape drives utilizing the Linear Tape File System (LTFS), in accordance with an embodiment of the present invention.

FIG. 2 is an example of an HSM system, which includes one or more tape drives utilizing the LTFS, in accordance with an embodiment of the present invention. FIG. 2 is an example of one possible embodiment of HSM system 116 from FIG. 1.

In this example, application 210 is an application running on a computing device, e.g., computing device 110 of FIG. 1, that has created a file which has been migrated to secondary storage. HSM 220 is the hierarchical storage management system. HSM 220 includes a primary storage and a secondary storage. In this example, the primary storage consists of HDD 230, and the secondary storage consists of LTFS 240 and Tape Library 250. HDD 230 can be a hard drive, a RAID, an SSD, or any other primary storage technology or combination of primary storage technologies as would be known to a person skilled in the art. HDD 230 includes Stub 232, which is a file stub which represents the presence of the file that has been migrated to the secondary storage.

LTFS 240 is software to enable access to a tape through an interface of the file system and represents the secondary storage of HSM 220. LTFS 240 includes File 242, which is a file created by application 210 that has been migrated to the secondary storage. Tape Library 250 is a storage system that may contain, for example, one or more tape drives; bays or slots to hold tape cartridges; a scanner of some kind, typically a barcode reader to identify individual tape cartridges; and a robotic system that automates the loading and changing of tapes. It is essentially a collection of tapes and tape drives that stores information, usually for backup. In this example, tape library 250 contains tape storage for two divisions, Division 1 251 and Division 2 255. Each division holds tapes organized by some criteria. For example, division 1 251 may hold records for a support division of a manufacturing company, and division 2 252 may hold records for a quality management division. Division 1 251 contains tape 1-1 252 through tape 1-n 253, and division 2 255 contains tape 2-1 256 through tape 2-n 257. In various embodiments of the invention, each division may contain any number of tapes. In this example, the records in division 1 251, which correspond to call center records, may be relevant to the quality assurance division.

In the example of FIG. 2, file 242 has been written to HSM 220 by application 210. Subsequently, the file has been migrated to the secondary storage through LTFS 240. The file is therefore now stored in division 1 251 of tape library 250, on one or more of tape 1-1 252 through tape 1-n 253, because this file is classified as a record for the support division. In this example, file 242 has been replaced on HDD 230 by stub 232.

In this example, file 242 has been stored on a tape in division 1 251 of tape library 250 since it is a support division file. But this file may also be relevant to the quality assurance division since support calls can indicate quality problems. If this file is requested by a user in the quality division along with other files containing related quality records, these files will have to be retrieved from different tapes in different divisions. The present invention is a method, computer program product, and system that allows for reclassification of files whenever they are moved from the migrated state, and when the files are subsequently moved back to the migrated state, they will be stored in a tape or tapes according to the updated classification, thereby avoiding the need to retrieve files from multiple tapes in the future.

FIG. 3 is a flowchart depicting operational steps of the resident to migrated procedure performed by reclassification program 112 to migrate files from the resident state, on a computing device within the distributed data processing environment of FIG. 1, in accordance with an embodiment of the present invention. In an alternative embodiment, the steps of workflow 300 may be performed by any other program while working with reclassification program 112.

In an embodiment, reclassification program 112 prepares a list of target files for the classification. In an embodiment, reclassification program 112 selects the first file in the list of target files. In an embodiment, reclassification program 112 determines if stub metadata already exists for the file from the list of target files. In an embodiment, reclassification program 112 determines if the stub metadata contains model information. In an embodiment, reclassification program 112 determines if the model information in the stub metadata is from the latest classification model. In an embodiment, reclassification program 112 classifies the file data using the classification methods described above. In an embodiment, reclassification program 112 selects a target tape or tapes for the file migration based on the classification result. In an embodiment, reclassification program 112 stores the stub metadata for the file in a file stub created on the primary storage where the original file was stored. In an embodiment, reclassification program 112 determines if there are files remaining in the target list to analyze. In an embodiment, reclassification program 112 selects the next file in the list of target files.

It should be appreciated that embodiments of the present invention provide at least for the resident to migrated procedure of reclassification program 112 for automatically reclassifying files in an HSM system. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 3 illustrates one possible iteration of the resident to migrated procedure of reclassification program 112, which repeats each time a file is moved from the resident state to the migrated state.

Reclassification program 112 prepares a list of target files (step 302). In an embodiment, reclassification program 112 prepares a list of target files for the classification. In an embodiment, the target files to be migrated may be received from a user. In another embodiment, the target files may be selected by reclassification program 112 based on the elapse of a prescribed time since the files were brought into the pre-migrated state. In yet another embodiment, the target files may be selected by reclassification program 112 based on a large file size according to usage guidelines of the primary storage. In an embodiment, reclassification program 112 may select the list of target files using any method of selection as would be known to a person skilled in the art.

Reclassification program 112 selects the first file in the list (step 304). In an embodiment, reclassification program 112 selects the first file in the list of target files prepared in step 302.

Reclassification program 112 determines if the stub metadata exists (decision block 306). In an embodiment, reclassification program 112 determines if stub metadata already exists for the file from the list of target files. In an embodiment, if reclassification program 112 determines that stub metadata does not already exist for the file ("no" branch, decision block 306), then reclassification program 112 proceeds to step 312 to classify the file. In an embodiment, if reclassification program 112 determines that stub metadata already exists for the file ("yes" branch, decision block 306), then reclassification program 112 proceeds to decision block 308 to check the stub metadata in the file.

Reclassification program 112 determines if the stub metadata contains model information (decision block 308). In an embodiment, if reclassification program 112 determines that stub metadata already exists for the file, then reclassification program 112 determines if the stub metadata contains model information. In an embodiment, if reclassification program 112 determines that the stub metadata contains model information ("yes" branch, decision block 308), then reclassification program 112 continues to decision block 310 to determine if the classification data is from the latest model. In an embodiment, if reclassification program 112 determines that the stub metadata does not contain model information ("no" branch, decision block 308), then reclassification program 112 proceeds to proceeds to step 312 to classify the file.

Reclassification program 112 determines if the stub metadata is from the latest model (decision block 310). In an embodiment, if reclassification program 112 determines the stub metadata contains model information, then reclassification program 112 determines if the model information in the stub metadata is from the latest classification model, as discussed above. For example, reclassification program 112 may determine if the model information in the stub metadata is from the latest classification model by checking the creation date or version number of the classification model against a database of classification models. In an embodiment, if reclassification program 112 determines that the model information in the stub metadata is not from the latest classification model ("no" branch, decision block 310), then reclassification program 112 proceeds to step 312 to reclassify the file. In an embodiment, if reclassification program 112 determines that the model information in the stub metadata is from the latest classification model ("yes" branch, decision block 310), then reclassification program 112 proceeds to step 314 to select the tape for migration.

Reclassification program 112 classifies the file and stores the model information and classification results in the stub metadata (step 312). In an embodiment, reclassification program 112 classifies the data by applying natural language processing to the text data and preparing a document classification model with machine learning based on supervised learning. In an embodiment, the model information is created by the document classification model. In another embodiment, reclassification program 112 classifies the data by using the metadata of the documents (e.g., Timestamp, File Type (text, PDF, word processing file, etc.), File name, Access Control List (ACL), etc.). In another embodiment, reclassification program 112 classifies the data by using both by applying natural language processing to the text data and by using the metadata of the documents. In an embodiment, reclassification program 112 stores the results of the classification in a stub metadata for the file.

Reclassification program 112 select tape for migration based on the classification result and migrates the file (step 314). In an embodiment, reclassification program 112 selects a target tape or tapes for the file migration based on the classification result. In an embodiment, reclassification program 112 may select multiple target tapes for the file migration based on the classification result. In an embodiment, reclassification program 112 then migrates the file to the selected target tape or tapes.

Reclassification program 112 stores the stub metadata in the stub (step 316). In an embodiment, reclassification program 112 stores the stub metadata for the file in a file stub created on the primary storage where the original file was stored.

Reclassification program 112 determines if there are more files to migrate (decision block 318). In an embodiment, reclassification program 112 determines if there are files remaining in the target list to analyze. In an embodiment, if reclassification program 112 determines that there are files remaining in the target list to analyze ("yes" branch, decision block 318), then reclassification program 112 proceeds to step 320 to select the next file. In an embodiment, if reclassification program 112 determines that there are no files remaining in the target list to analyze ("no" branch, decision block 318), then reclassification program 112 ends for this cycle.

Reclassification program 112 picks the next file in the list (step 320). In an embodiment, reclassification program 112 selects the next file in the list of target files prepared in step 304. In an embodiment, reclassification program 112 then returns to decision block 306 to analyze the selected file.

FIG. 4 is a flowchart depicting operational steps of the pre-migrated to migrated check procedure performed by reclassification program 112 whenever a file is a candidate to change from the pre-migrated state to the migrated state, on a computing device within the distributed data processing environment of FIG. 1, in accordance with an embodiment of the present invention. In an alternative embodiment, the steps of workflow 400 may be performed by any other program while working with reclassification program 112.

In an embodiment, reclassification program 112 selects the first file in the list of files to be migrated. In an embodiment, reclassification program 112 determines if the file to be migrated was classified by the latest model. In an embodiment, if reclassification program 112 determines that the file to be migrated was not classified by the latest model, then reclassification program 112 reclassifies the file data using the classification method as discussed in above. In an embodiment, reclassification program 112 determines if the classification results of the latest model are the same as the results from the previous classification model. In an embodiment, if reclassification program 112 determines that the file contains the latest model information, then the file stub is current, and there is no need to return the file to the resident state. Therefore, reclassification program 112 brings the file into the migrated state. In an embodiment, if reclassification program 112 determines that the classification results of the latest model are not the same as the results from the previous classification model, then reclassification program 112 updates the classification results for the file with the updated model information in the stub metadata. In an embodiment, reclassification program 112 then brings the file into the resident state on the primary storage. In an embodiment, reclassification program 112 determines if there are files remaining in the list of files to be migrated. In an embodiment, reclassification program 112 selects the next file in the list of files to be migrated.

It should be appreciated that embodiments of the present invention provide at least for the pre-migrated to migrated check procedure performed by reclassification program 112. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 4 is illustrates one possible iteration of the pre-migrated to migrated check procedure performed by reclassification program 112, which repeats whenever a file is a candidate to change from the pre-migrated state to the migrated state.

Reclassification program 112 selects the first file in the list (step 402). In an embodiment, reclassification program 112 selects the first file in the list of files to be migrated. In an embodiment, the list is received by reclassification program 112 from a user. In another embodiment, the list is created by reclassification program 112 based on HSM policies, such as the elapse of a prescribed time since the files were brought into the pre-migrated state. In yet another embodiment, reclassification program 112 receives the list based on any system policy for file migration.

Reclassification program 112 determines if the latest model was used (decision block 404). In an embodiment, reclassification program 112 determines if the file to be migrated was classified by the latest model. In an embodiment, reclassification program 112 determines if the file to be migrated was classified by the latest model as described above. For example, reclassification program 112 determines if the model information in the stub metadata is from the latest classification model by checking the creation date or version number of the classification model against a database of classification models. In an embodiment, if reclassification program 112 determines that the file to be migrated was classified by the latest model ("yes" branch, decision block 404), then reclassification program 112 proceeds to step 410 to migrate the file. In an embodiment, if reclassification program 112 determines that the file to be migrated was not classified by the latest model ("no" branch, decision block 404), then reclassification program 112 proceeds to step 406 to reclassify the file.

Reclassification program 112 classifies the file with the latest model and updates the model information in the stub metadata (step 406). In an embodiment, if reclassification program 112 determines that the file to be migrated was not classified by the latest model, then reclassification program 112 reclassifies the file data using the classification method as discussed in step 312 of FIG. 3 above. In an embodiment, reclassification program 112 updates the model information in the stub metadata for the file.

Reclassification program 112 determines if the classification result is the same as the previous result (decision block 408). In an embodiment, reclassification program 112 determines if the classification results of the latest model are the same as the results from the previous classification model. In an embodiment, if reclassification program 112 determines that the classification results of the latest model are the same as the results from the previous classification model ("yes" branch, decision block 408), then reclassification program 112 proceeds to step 410 to migrate the file. In an embodiment, if reclassification program 112 determines that the classification results of the latest model are not the same as the results from the previous classification model ("no" branch, decision block 408), then reclassification program 112 proceeds to step 412 to update the classification results.

Reclassification program 112 brings the file into the migrated state (step 410). In an embodiment, if reclassification program 112 determines that the file contains the latest model information, then the file stub is current, and there is no need to return the file to the resident state. Therefore, reclassification program 112 brings the file into the migrated state. Reclassification program 112 then proceeds to decision block 416 to determine if there are more files to analyze.

Reclassification program 112 updates the classification result in the stub metadata (step 412). In an embodiment, if reclassification program 112 determines that the classification results of the latest model are not the same as the results from the previous classification model, then reclassification program 112 updates the classification results for the file with the updated model information in the stub metadata.

Reclassification program 112 brings the file into the resident state (step 414). In an embodiment, reclassification program 112 then brings the file into the resident state on the primary storage. The file, now with updated model information, will be migrated when the file next meets a system migration criteria, and the target tape or tapes will be selected based on the updated model information from the reclassification.

Reclassification program 112 determines if there are more files to migrate (decision block 416). In an embodiment, reclassification program 112 determines if there are files remaining in the list of files to be migrated. In an embodiment, if reclassification program 112 determines that there are files remaining in the list of files to be migrated ("yes" branch, decision block 416), then reclassification program 112 proceeds to step 418 to select the next file. In an embodiment, if reclassification program 112 determines that there are no files remaining in the list of files to be migrated ("no" branch, decision block 416), then reclassification program 112 ends for this cycle.

Reclassification program 112 picks the next file in the list (step 418). In an embodiment, reclassification program 112 selects the next file in the list of files to be migrated. In an embodiment, reclassification program 112 then returns to decision block 404 to analyze the selected file.

Figure 5:
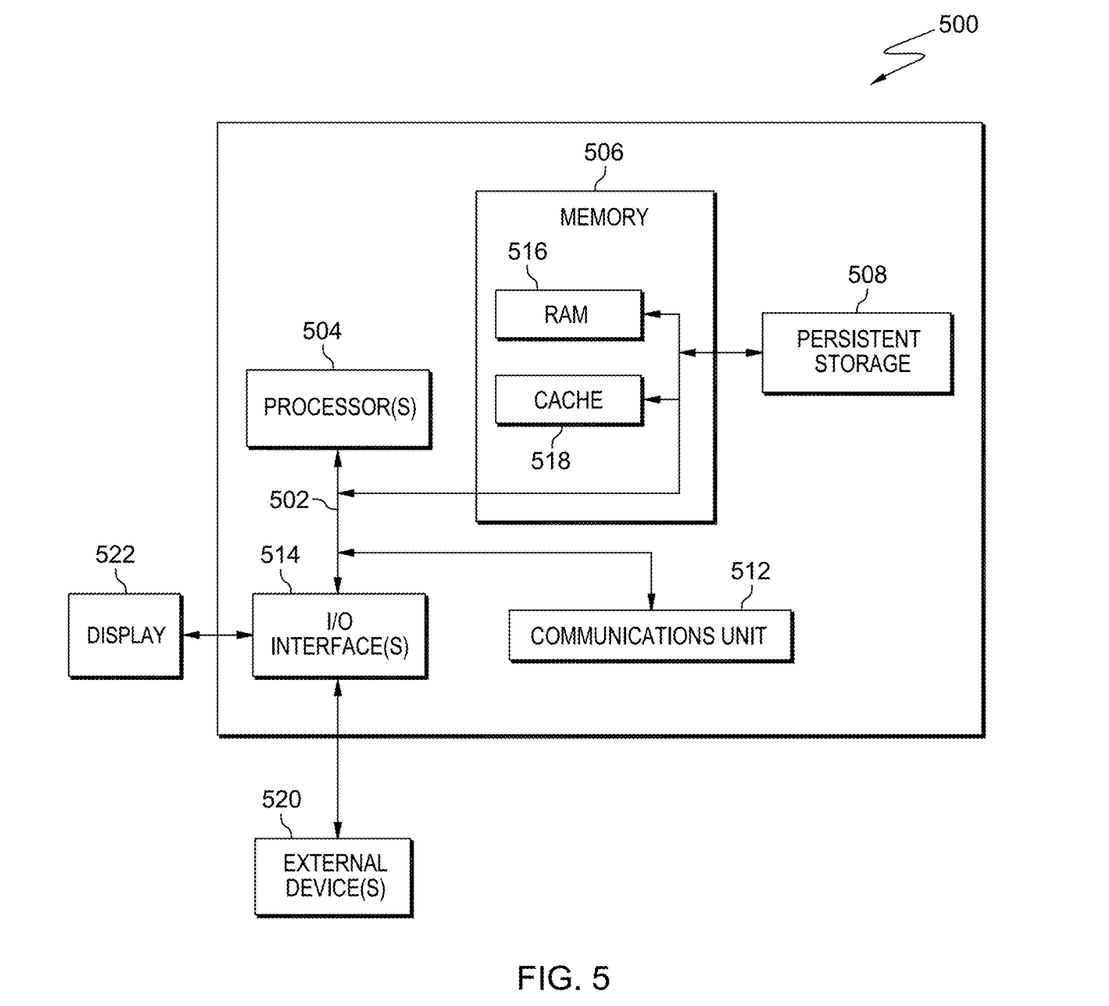
FIG. 5 depicts a block diagram of components of the computing devices executing the reclassification program within the distributed data processing environment of FIG. 1, in accordance with an embodiment of the present invention.

FIG. 5 is a block diagram depicting components of computing device 110 suitable for reclassification program 112, in accordance with at least one embodiment of the invention. FIG. 5 displays the computer 500, one or more processor(s) 504 (including one or more computer processors), a communications fabric 502, a memory 506 including, a random-access memory (RAM) 516, and a cache 518, a persistent storage 508, a communications unit 512, I/O interfaces 514, a display 522, and external devices 520. It should be appreciated that FIG. 5 provides only an illustration of one embodiment and does not imply any limitations with regard to the environments in which different embodiments may be implemented. Many modifications to the depicted environment may be made.

As depicted, the computer 500 operates over the communications fabric 502, which provides communications between the computer processor(s) 504, memory 506, persistent storage 508, communications unit 512, and I/O interface(s) 514. The communications fabric 502 may be implemented with an architecture suitable for passing data or control information between the processors 504 (e.g., microprocessors, communications processors, and network processors), the memory 506, the external devices 520, and any other hardware components within a system. For example, the communications fabric 502 may be implemented with one or more buses.

The memory 506 and persistent storage 508 are computer readable storage media. In the depicted embodiment, the memory 506 comprises a RAM 516 and a cache 518. In general, the memory 506 can include any suitable volatile or non-volatile computer readable storage media. Cache 518 is a fast memory that enhances the performance of processor(s) 504 by holding recently accessed data, and near recently accessed data, from RAM 516.

Program instructions for reclassification program 112 may be stored in the persistent storage 508, or more generally, any computer readable storage media, for execution by one or more of the respective computer processors 504 via one or more memories of the memory 506. The persistent storage 508 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

The communications unit 512, in these examples, provides for communications with other data processing systems or devices. In these examples, the communications unit 512 includes one or more network interface cards. The communications unit 512 may provide communications through the use of either or both physical and wireless communications links. In the context of some embodiments of the present invention, the source of the various input data may be physically remote to the computer 500 such that the input data may be received, and the output similarly transmitted via the communications unit 512.

The I/O interface(s) 514 allows for input and output of data with other devices that may be connected to computer 500. For example, the I/O interface(s) 514 may provide a connection to external device(s) 520 such as a keyboard, a keypad, a touch screen, a microphone, a digital camera, and/or some other suitable input device. External device(s) 520 can also include portable computer readable storage media such as, for example, thumb drives, portable optical or magnetic disks, and memory cards. Software and data used to practice embodiments of the present invention, e.g., reclassification program 112, can be stored on such portable computer readable storage media and can be loaded onto persistent storage 508 via the I/O interface(s) 514. I/O interface(s) 514 also connect to a display 522.

Display 522 provides a mechanism to display data to a user and may be, for example, a computer monitor. Display 522 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
responsive to occurrence of a recall to move a file on a hierarchical storage system from a secondary storage to a primary storage, determining, by one or more computer processors, whether stub metadata exists for the file, wherein the stub metadata comprises an identifier identifying a model version;
responsive to determining that stub metadata exists for the file, determining, by the one or more computer processors, whether reclassification of the file is necessary based on a check of the stub metadata against a database of classification models;
responsive to determining that the reclassification of the file is necessary, reclassifying, by the one or more computer processors, the file, wherein the reclassification uses a latest classification model, and further wherein the stub metadata is updated with results of the reclassification; and
migrating, by the one or more computer processors, the file from the primary storage to the secondary storage, wherein the file is migrated to the secondary storage based on the stub metadata.

2. The computer-implemented method of claim 1, wherein responsive to determining that the reclassification of the file is necessary, reclassifying, by the one or more computer processors, the file, wherein the reclassification uses the latest classification model further comprises:
determining, by the one or more computer processors, whether the stub metadata is based on the latest classification model; and
responsive to determining that the stub metadata is not based on the latest classification model, determining, by the one or more computer processors, that the reclassification of the file is necessary.

3. The computer-implemented method of claim 2, further comprising:
responsive to determining that the stub metadata is based on the latest classification model, migrating, by the one or more computer processors, the file to the secondary storage; and
storing, by the one or more computer processors, the stub metadata in a file stub on the primary storage.

4. The computer-implemented method of claim 1, wherein migrating the file from the primary storage to the secondary storage, wherein the file is migrated to the secondary storage based on the stub metadata further comprises:
selecting, by the one or more computer processors, a tape for migration, wherein the tape is selected based on the stub metadata;
storing, by the one or more computer processors, the file on the tape; and
storing, by the one or more computer processors, the stub metadata in a file stub on the primary storage.

5. The computer-implemented method of claim 4, wherein the file is migrated to a plurality of tapes.

6. The computer-implemented method of claim 1, wherein responsive to determining that the stub metadata exists for the file, determining whether the reclassification of the file is necessary based on the stub metadata and responsive to determining that the reclassification of the file is necessary, reclassifying the file, wherein the reclassification uses the latest classification model, and further wherein the stub metadata is updated with the results of the reclassification comprises:
responsive to determining that the stub metadata does not exist for the file, classifying, by the one or more computer processors, the file, wherein the classification uses the latest classification model; and
updating, by the one or more computer processors, the stub metadata with a results of the classification.

7. The computer-implemented method of claim 1, wherein migrating the file from the primary storage to the secondary storage, wherein the file is migrated to the secondary storage based on the stub metadata comprises:
bringing, by the one or more computer processors, the file into a resident state; and
responsive to initiating a new migration cycle, migrating, by the one or more computer processors, the file to the secondary storage based on the stub metadata.

8. A computer program product comprising one or more computer readable storage media and program instructions stored on the one or more computer readable storage media, the program instructions including instructions to:
responsive to occurrence of a recall to move a file on a hierarchical storage system from a secondary storage to a primary storage, determine whether stub metadata exists for the file, wherein the stub metadata comprises an identifier identifying a model version;
responsive to determining that stub metadata exists for the file, determine whether reclassification of the file is necessary based on a check of the stub metadata against a database of classification models;
responsive to determining that the reclassification of the file is necessary, reclassify the file, wherein the reclassification uses a latest classification model, and further wherein the stub metadata is updated with results of the reclassification; and
migrate the file from the primary storage to the secondary storage, wherein the file is migrated to the secondary storage based on the stub metadata.

9. The computer program product of claim 8, wherein responsive to determining that the reclassification of the file is necessary, reclassify the file, wherein the reclassification uses the latest classification model, and further wherein the stub metadata is updated with the results of the reclassification further comprises one or more of the following program instructions, stored on the one or more computer readable storage media, to:
determine whether the stub metadata is based on the latest classification model; and
responsive to determining that the stub metadata is not based on the latest classification model, determine that the reclassification of the file is necessary.

10. The computer program product of claim 9, further comprising one or more of the following program instructions, stored on the one or more computer readable storage media, to:
responsive to determining that the stub metadata is based on the latest classification model, migrate the file to the secondary storage; and
store the stub metadata in a file stub on the primary storage.

11. The computer program product of claim 8, wherein migrate the file from the primary storage to the secondary storage, wherein the file is migrated to the secondary storage based on the stub metadata further comprises one or more of the following program instructions, stored on the one or more computer readable storage media, to:
select a tape for migration, wherein the tape is selected based on the stub metadata;
store the file on the tape; and store the stub metadata in a file stub on the primary storage.

12. The computer program product of claim 11, wherein the file is migrated to a plurality of tapes.

13. The computer program product of claim 8, wherein responsive to determining that the stub metadata exists for the file, determine whether the reclassification of the file is necessary based on the stub metadata and responsive to determining that the reclassification of the file is necessary, reclassify the file, wherein the reclassification uses the latest classification model, and further wherein the stub metadata is updated with the results of the reclassification comprises one or more of the following program instructions, stored on the one or more computer readable storage media, to:
   responsive to determining that the stub metadata does not exist for the file, classify the file, wherein the classification uses the latest classification model; and
   update the stub metadata with a results of the classification.

14. The computer program product of claim 8, wherein migrate the file from the primary storage to the secondary storage, wherein the file is migrated to the secondary storage based on the stub metadata comprises one or more of the following program instructions, stored on the one or more computer readable storage media, to:
   bring the file into a resident state; and
   responsive to initiating a new migration cycle, migrate the file to the secondary storage based on the stub metadata.

15. A computer system comprising:
   one or more computer processors;
   one or more computer readable storage media; and
   program instructions stored on the one or more computer readable storage media for execution by at least one of the one or more computer processors, the stored program instructions including instructions to:
   responsive to occurrence of a recall to move a file on a hierarchical storage system from a secondary storage to a primary storage, determine whether stub metadata exists for the file, wherein the stub metadata comprises an identifier identifying a model version;
   responsive to determining that stub metadata exists for the file, determine whether reclassification of the file is necessary based on a check of the stub metadata against a database of classification models;
   responsive to determining that the reclassification of the file is necessary, reclassify the file, wherein the reclassification uses a latest classification model, and further wherein the stub metadata is updated with results of the reclassification; and
   migrate the file from the primary storage to the secondary storage, wherein the file is migrated to the secondary storage based on the stub metadata.

16. The computer system of claim 15, wherein responsive to determining that the reclassification of the file is necessary, reclassify the file, wherein the reclassification uses the latest classification model, and further wherein the stub metadata is updated with the results of the reclassification further comprises one or more of the following program instructions, stored on the one or more computer readable storage media, to:
   determine whether the stub metadata is based on the latest classification model; and
   responsive to determining that the stub metadata is not based on the latest classification model, determine that the reclassification of the file is necessary.

17. The computer system of claim 16, further comprising one or more of the following program instructions, stored on the one or more computer readable storage media, to:
   responsive to determining that the stub metadata is based on the latest classification model, migrate the file to the secondary storage; and
   store the stub metadata in a file stub on the primary storage.

18. The computer system of claim 15, wherein migrate the file from the primary storage to the secondary storage, wherein the file is migrated to the secondary storage based on the stub metadata further comprises one or more of the following program instructions, stored on the one or more computer readable storage media, to:
   select a tape for migration, wherein the tape is selected based on the stub metadata;
   store the file on the tape; and
   store the stub metadata in a file stub on the primary storage.

19. The computer system of claim 15, wherein responsive to determining that the stub metadata exists for the file, determine whether the reclassification of the file is necessary based on the stub metadata and responsive to determining that the reclassification of the file is necessary, reclassify the file, wherein the reclassification uses the latest classification model, and further wherein the stub metadata is updated with the results of the reclassification comprises one or more of the following program instructions, stored on the one or more computer readable storage media, to:
   responsive to determining that the stub metadata does not exist for the file, classify the file, wherein the classification uses the latest classification model; and
   update the stub metadata with a results of the classification.

20. The computer system of claim 15, wherein migrate the file from the primary storage to the secondary storage, wherein the file is migrated to the secondary storage based on the stub metadata comprises one or more of the following program instructions, stored on the one or more computer readable storage media, to:
   bring the file into a resident state; and
   responsive to initiating a new migration cycle, migrate the file to the secondary storage based on the stub metadata.

* * * * *